United States Patent
Ko et al.

(10) Patent No.: US 9,925,891 B2
(45) Date of Patent: Mar. 27, 2018

(54) METHOD FOR REDUCING DRIVE SHAFT VIBRATION OF ECO-FRIENDLY VEHICLE

(71) Applicant: HYUNDAI MOTOR COMPANY, Seoul (KR)

(72) Inventors: Young Kwan Ko, Seoul (KR); Tae Young Chung, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 171 days.

(21) Appl. No.: 14/957,582

(22) Filed: Dec. 2, 2015

(65) Prior Publication Data

US 2017/0043677 A1 Feb. 16, 2017

(30) Foreign Application Priority Data

Aug. 12, 2015 (KR) .................. 10-2015-0113631

(51) Int. Cl.
| | |
|---|---|
| *B60L 11/00* | (2006.01) |
| *B60L 15/20* | (2006.01) |
| *B60K 6/48* | (2007.10) |
| *B60W 10/06* | (2006.01) |
| *B60W 10/08* | (2006.01) |
| *B60W 30/20* | (2006.01) |

(Continued)

(52) U.S. Cl.
CPC ............. *B60L 15/20* (2013.01); *B60K 6/48* (2013.01); *B60W 10/06* (2013.01); *B60W 10/08* (2013.01); *B60W 20/15* (2016.01); *B60W 30/20* (2013.01); *B60K 2006/4825* (2013.01); *B60L 2240/423* (2013.01); *B60L 2240/486* (2013.01); *B60L 2260/44* (2013.01); *B60W 2030/206* (2013.01); *B60W 2050/0008* (2013.01); *B60W 2050/0041* (2013.01); *B60W 2510/104* (2013.01); *B60W 2510/1045* (2013.01); *B60W 2710/0666* (2013.01); *B60W 2710/083* (2013.01); *B60W 2710/1022* (2013.01); *B60Y 2200/92* (2013.01); *Y02T 10/56* (2013.01); *Y02T 10/6221* (2013.01); *Y02T 10/6252* (2013.01); *Y02T 10/6286* (2013.01); *Y02T 10/7258* (2013.01)

(58) Field of Classification Search
CPC ... B60L 15/20; B60L 2240/423; B60W 20/15; B60W 10/06; B60W 30/20; B60K 6/48; B60K 2006/4825; Y02T 10/642; G05B 17/02
USPC ................... 701/22, 36; 180/65.265
See application file for complete search history.

(56) References Cited

U.S. PATENT DOCUMENTS

| | | | | |
|---|---|---|---|---|
| 6,756,758 B2 * | 6/2004 | Karikomi | ............... | G05D 19/02 180/197 |
| 9,150,117 B2 * | 10/2015 | Itou | .......... | B60L 15/20 |

(Continued)

FOREIGN PATENT DOCUMENTS

| | | |
|---|---|---|
| JP | 2004-248411 A | 9/2004 |
| JP | 2012-029474 A | 2/2012 |

(Continued)

*Primary Examiner* — Gertrude Arthur Jeanglaude
(74) *Attorney, Agent, or Firm* — McDermott Will & Emery LLP (57) ABSTRACT

A method for reducing vibration of a drive shaft of an eco-friendly vehicle includes calculating a model velocity of the drive shaft, obtaining a vibration component based on a deviation between an actual velocity of the drive shaft and the calculated model velocity, and generating a vibration reduction compensation torque for reduction in vibration of the drive shaft from the vibration component.

23 Claims, 7 Drawing Sheets

(51) Int. Cl.
*B60W 20/15* (2016.01)
*B60W 50/00* (2006.01)

(56) References Cited

U.S. PATENT DOCUMENTS

| | | | |
|---|---|---|---|
| 2003/0029653 A1* | 2/2003 | Fujikawa | B60W 10/04 180/65.25 |
| 2012/0081051 A1 | 4/2012 | Kobayashi et al. | |
| 2013/0184918 A1* | 7/2013 | Motosugi | B60L 15/20 701/22 |

FOREIGN PATENT DOCUMENTS

| | | |
|---|---|---|
| JP | 2012-080655 A | 4/2012 |
| JP | 2013-223374 A | 10/2013 |
| KR | 10-2011-0049934 A | 5/2011 |
| KR | 10-2013-0060907 A | 6/2013 |
| KR | 10-1438628 B1 | 9/2014 |
| KR | 10-1448746 B1 | 10/2014 |

\* cited by examiner

FIG. 1

-- Related Art --

FIG. 2

-- Related Art --

FIG. 9

METHOD FOR REDUCING DRIVE SHAFT VIBRATION OF ECO-FRIENDLY VEHICLE

CROSS-REFERENCE TO RELATED APPLICATION

This application claims under 35 U.S.C. § 119(a) the benefit of priority to Korean Patent Application No. 10-2015-0113631 filed on Aug. 12, 2015, the entire content of which is incorporated herein by reference.

TECHNICAL FIELD

The present disclosure relates to a method for reducing drive shaft vibration of an eco-friendly vehicle. More particularly, the present disclosure relates to a control method for reduction in drive shaft vibration of an eco-friendly vehicle in which vibration generated from a drive shaft is reduced using a motor mechanically connected to the drive shaft.

BACKGROUND

In general, an eco-friendly vehicle such as a pure electric vehicle (EV) or a hybrid electric vehicle (HEV) is driven using an electric motor as a driving source.

The pure EV is driven only using power of the electric motor that operates by battery power, and the HEV is driven by efficiently combining power of an engine and power of the electric motor.

Other examples of the eco-friendly vehicle may include a fuel cell electric vehicle (FCEV) which is driven by operating an electric motor using power generated from a fuel cell.

The FCEV is also a vehicle which is driven using an electric motor, and may be broadly classified as the EV, which is driven by electric power, together with the pure EV and the HEV.

Figure 1:
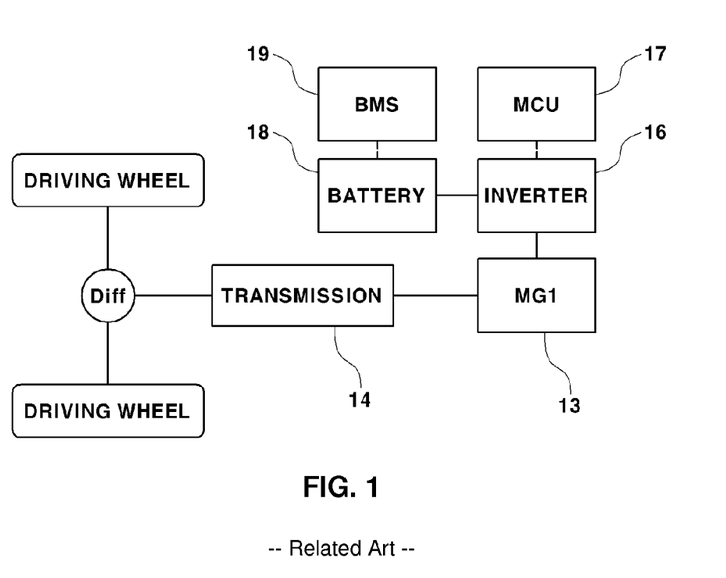
FIG. 1 is a block diagram illustrating a system configuration of an electric vehicle (EV) according to the related art.

FIG. 1 illustrates a system configuration of the EV. As illustrated in the figure, a driving motor (MG1) 13 and a drive shaft are mechanically connected to each other, and the EV includes a motor control unit (MCU) 17 including an inverter 16 for driving and controlling the driving motor 13, a high-voltage battery 18 for supplying driving power to the driving motor 13, and a battery management system (BMS) 19 for controlling the battery 18.

Here, the battery 18 functions as a driving source (power source) of the vehicle and is connected to the driving motor 13 through the inverter 16 in a chargeable and dischargeable manner, and the inverter 16 inverts a direct current of the battery 18 into three-phase alternating current and applies the inverted current to the driving motor 13 in order to drive the driving motor 13.

The BMS 19 collects battery state information such as a voltage, a current, a temperature, a state of charge (SOC) (%), etc. of the battery 18. Here, the BMS 19 provides the collected battery state information to another controller in the vehicle, or directly participates in control of battery charging and discharging using the battery state information.

Figure 2:
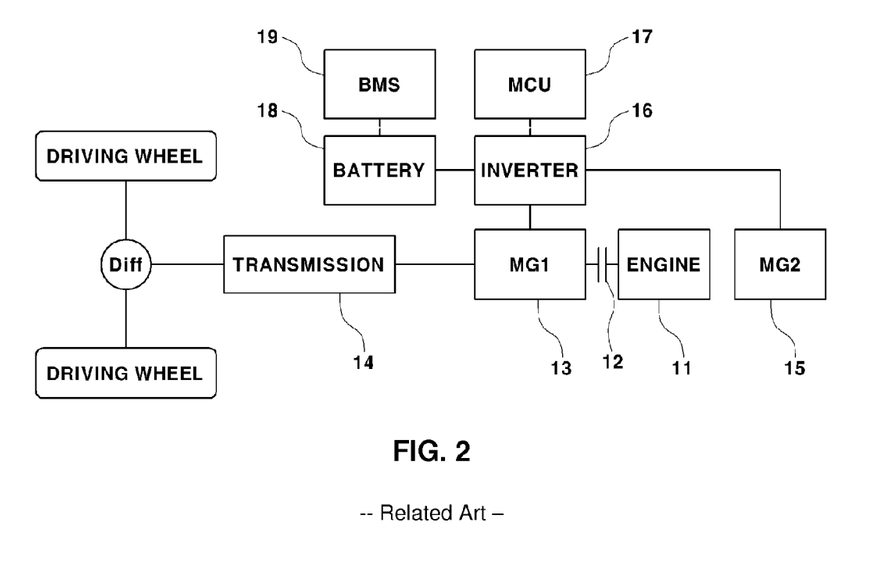
FIG. 2 is a block diagram illustrating a system configuration of a hybrid electric vehicle (HEV) according to the related art.

FIG. 2 illustrates a system configuration of the HEV, and illustrates a power train configuration using a transmission mounted electric device (TMED) in which a transmission 14 is disposed at an output side of a driving motor 13.

As illustrated in the figure, the HEV includes an engine 11 and the driving motor 13 disposed in series to function as driving sources for vehicle driving, an engine clutch 12 disposed between the engine 11 and the driving motor 13 to connect or block power, the transmission 14 for shifting power of the engine 11 and the driving motor 13 and transferring the shifted power to a drive shaft, and a starter-generator (MG2) 15 directly connected to the engine 11 to be able to transfer power.

The engine clutch 12 connects or blocks power between two driving sources, that is, the engine 11 and the driving motor 13 that drive the vehicle through a locking-up or opening operation.

In addition, a battery 18 that functions as a power source of the vehicle is connected to the driving motor 13 and the starter-generator 15 in a chargeable and dischargeable manner through an inverter 16. The inverter 16 inverts a direct current of the battery 18 into a three-phase alternating current and applies the inverted current to the driving motor 13 and the starter-generator 15 in order to drive the driving motor 13 and the starter-generator 15.

The starter-generator 15 performs an integrated function of a starter motor and a generator. The starter-generator 15 starts the engine 11 by transferring power thereof to the engine 11 through a power transmission mechanism (for example, a belt and a pulley) when driving or generates power by receiving a rotating force transferred from the engine 11, and charges the battery 18 with electric energy generated during a generation operation.

However, in the above-described conventional eco-friendly vehicle, is disadvantageous in that mechanical damping effect of an existing torque converter cannot be acquired.

Therefore, there has been a problem of degrading comfort and operability due to a vibration phenomenon such as shock or jerk (instantaneous and rapid motion) together with occurrence of vibration of a drive shaft when a speed is changed, when a tip-in/out operation (operation of pressing or releasing an accelerator pedal) is performed and when an engine clutch is defective, etc.

That is, vibration from a torque source (engine or motor) or vibration from the outside is rarely attenuated since a damper disposed between the torque source and a driving system is small not being used.

A vibration component of the drive shaft needs to be extracted to reduce vibration occurring from the drive shaft. Vibration reduction performance varies according to accuracy of extraction of the vibration component, and thus, it is important to accurately extract the vibration component.

In a conventional anti-jerk control technology as a method of suppressing vibration of a drive shaft for solving the above-mentioned problem, a deviation between a model velocity and an actual velocity of a motor is recognized as vibration, the deviation between the velocities is multiplied by a certain value, and the multiplied value is fed back, thereby suppressing vibration.

For example, an apparatus and a method for controlling anti-jerk have been studied, in which a reference velocity deviation and a velocity deviation average value are calculated from a velocity deviation between a model velocity and an actual velocity of a motor, whether vibration occurs from a drive shaft is determined. A magnitude of a torque for motor correction for anti-jerk used to reduce vibration of the drive shaft is calculated to control a motor torque when vibration is determined to occur from the drive shaft.

In the technology, an ideal model for the drive shaft, that is, a model capable of calculating an ideal velocity (model velocity) of the drive shaft which ignores vibration is designed, and a net torque of the drive shaft obtained by subtracting a drag torque from a motor torque instruction is input to the model, thereby obtaining a velocity of the drive shaft excluding a vibration component (hereinafter referred to as a model velocity).

Here, the model for calculating the model velocity cannot accurately consider a load torque, etc. generated in an actual vehicle, and thus, a calculated model velocity contains an error. In order to correct the error, a difference between the model velocity and the actual velocity of the motor is multiplied by a certain gain value to calculate a correction torque, and then the net torque of the drive shaft is corrected.

However, correction is performed only when the difference between the model velocity and the actual velocity is present, and thus, accuracy is low.

In addition, a method and a system for controlling anti-jerk have been studied, in which a model velocity is calculated using a velocity of a wheel which is mechanically connected to a driving motor.

When a model velocity is calculated using a velocity of a wheel as described above, it is possible to accurately calculate the model velocity since a load applied to the wheel is great, and thus, vibration occurring from a drive shaft is attenuated.

In addition, the model velocity may be accurately calculated since the wheel velocity is a component generated by attenuation of vibration of the drive shaft. A load factor is low since the model velocity is calculated using only signal processing for the wheel velocity.

However, even when the wheel is mechanically connected to the drive shaft, the wheel velocity is delayed when compared to a velocity of the drive shaft in a dynamical relation. When a vehicle state rapidly changes, for example, when a vehicle is accelerated or decelerated, a delay component may increase, and thus, an erroneous vibration component may be extracted.

When the vibration component is erroneously extracted due to the above-described delay, a compensation torque for reducing vibration determined by the erroneously extracted vibration component may be output such that acceleration/deceleration of the vehicle is impeded.

A method of obtaining a model velocity has been developed, in which an ideal model is designed for a drive shaft, and a calculated net torque of the drive shaft is inputted into the model.

Here, an error contained in the obtained model velocity is presumed to be an error generated by a disturbance torque applied to a vehicle. After the error is estimated, the disturbance torque is compensated by a net torque component of the drive shaft to calculate the model velocity.

Therefore, it is possible to more accurately calculate a model velocity when compared to an existing model velocity calculation scheme using a torque.

The disturbance torque is calculated by inputting a measured drive shaft velocity to a reciprocal of a designed drive shaft model to estimate a torque input to the drive shaft, and then comparing the estimated torque with the input net torque of the drive shaft.

In a reciprocal of a transfer function of the drive shaft model, an order of the numerator may be greater than an order of the denominator, which corresponds to differentiation in a mathematical sense. When the transfer function is used, noise of a signal of the measured drive shaft velocity occurs.

SUMMARY OF THE DISCLOSURE

The present disclosure has been made in an effort to solve the above-described problems associated with prior art. An aspect of the present inventive concept provides a method for reducing drive shaft vibration of an eco-friendly vehicle capable of effectively reducing vibration generated from a drive shaft by improving a model velocity calculation such that an accurate vibration component can be extracted.

According to one embodiment in the present disclosure, a method for reducing vibration of a drive shaft of an eco-friendly vehicle including: acquiring an actual velocity of the drive shaft from which a torque of a driving motor driving the vehicle is output; calculating a model velocity of the drive shaft; obtaining a vibration component based on a deviation between the acquired actual velocity of the drive shaft and the calculated model velocity; and generating a vibration reduction compensation torque for reduction in vibration of the drive shaft from the vibration component, wherein the calculating for the model velocity includes calculating a drive shaft output requirement torque based on a torque delivered to the drive shaft; estimating a drive shaft input torque input to the drive shaft using the actual velocity of the drive shaft; estimating a disturbance torque using the drive shaft output requirement torque and the drive shaft input torque; calculating a drive shaft model input torque obtained by adding the disturbance torque to the drive shaft output requirement torque using the estimated disturbance torque; and calculating the model velocity using a drive shaft model receiving the drive shaft model input torque as an input.

According to another embodiment in the present disclosure, a method for reducing vibration of a drive shaft of an eco-friendly vehicle including: acquiring current vehicle state information; acquiring an actual velocity of the drive shaft from which a torque of a driving motor driving the vehicle is output; determining a model velocity calculation scheme corresponding to one of a torque-based model velocity calculation scheme performed in the calculating of the model velocity and a wheel velocity-based model velocity calculation scheme of calculating a model velocity based on wheel velocity information of the vehicle according to the acquired vehicle state information; calculating a model velocity of the drive shaft by changing a current model velocity calculation scheme to the determined model velocity calculation scheme when the determined model velocity calculation scheme is different from the current model velocity calculation scheme; obtaining a vibration component based on a deviation between the acquired actual velocity of the drive shaft and the calculated model velocity; and generating a vibration reduction compensation torque for reduction in vibration of the drive shaft from the vibration component.

Other aspects and embodiments of the invention are discussed infra.

It is understood that the terms "vehicle" and "vehicular" and other similar terms as used herein are inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

The present disclosure relates to a method for reducing drive shaft vibration of an eco-friendly vehicle in which vibration generated from a drive shaft is reduced using a motor mechanically connected to the drive shaft. In particular, the present disclosure provides an improved method of calculating a model velocity such that an accurate vibration component can be extracted.

As described in the foregoing, a vibration component of the drive shaft needs to be extracted to reduce vibration occurring from the drive shaft. Vibration reduction performance varies according to accuracy of extraction of the vibration component, and thus, it is important to accurately extract the vibration component.

The vibration component of the drive shaft is extracted as below. An ideal model for the drive shaft, that is, a calculation model capable of calculating an ideal velocity (model velocity) of the drive shaft which does not consider vibration is designed. A model velocity corresponding to the drive shaft velocity excluding the vibration component is calculated using the calculation model, thereby extracting the vibration component using a difference between the calculated model velocity and an actual velocity corresponding to an actual drive shaft velocity.

When the model velocity is accurately calculated as the ideal velocity of the drive shaft excluding the vibration component, an accurate vibration component may be extracted by calculating the difference between the two velocities. However, the calculated model velocity contains an error component when compared to the ideal velocity of the drive shaft excluding the vibration component.

In order to eliminate the error, the difference between the model velocity and the actual velocity (actual drive shaft velocity) is obtained, and then error elimination control using a high pass filter (HPF), etc. is applied. An appropriate order of an error elimination controller needs to be determined based on a form (order) of the error component.

In general, the order of the error elimination controller increases in proportion to the order of the error component, and occurrence of phase delay increases as the order of the error elimination controller increases. Thus, a different vibration component from actual vibration may be extracted.

That is, when the order of the error component is minimized, an accurate vibration component may be extracted. The model velocity needs to be calculated to be a value as close to the ideal drive shaft velocity excluding the vibration component as possible in order to reduce the order of the error elimination controller including the filter, etc.

In this regard, a disturbance torque applied to a vehicle may be observed using a disturbance observer when the model velocity is calculated, and the disturbance torque may be compensated when the model velocity is calculated, thereby minimizing the order of an error component contained in the model velocity. In this way, accuracy of extraction of the vibration component may be enhanced.

The present disclosure may be applied to both the pure EV having the system configuration illustrated in FIG. 1 and the HEV having the system configuration illustrated in FIG. 2. FIGS. 1 and 2 will be referred to in description below with regard to the system configurations of the EV and the HEV.

The drive shaft is a shaft from which a torque of the driving motor 13 is output in the systems of FIGS. 1 and 2. The drive shaft corresponds to an output shaft of a driving motor and an input shaft of a transmission. Here, a velocity of the drive shaft is the same as a velocity of the motor.

Therefore, in description below, a drive shaft velocity may be replaced by a motor velocity, and a drive shaft model may be replaced by a motor model.

The present disclosure will be described below with reference to FIGS. 3 and 4.

Figure 3:
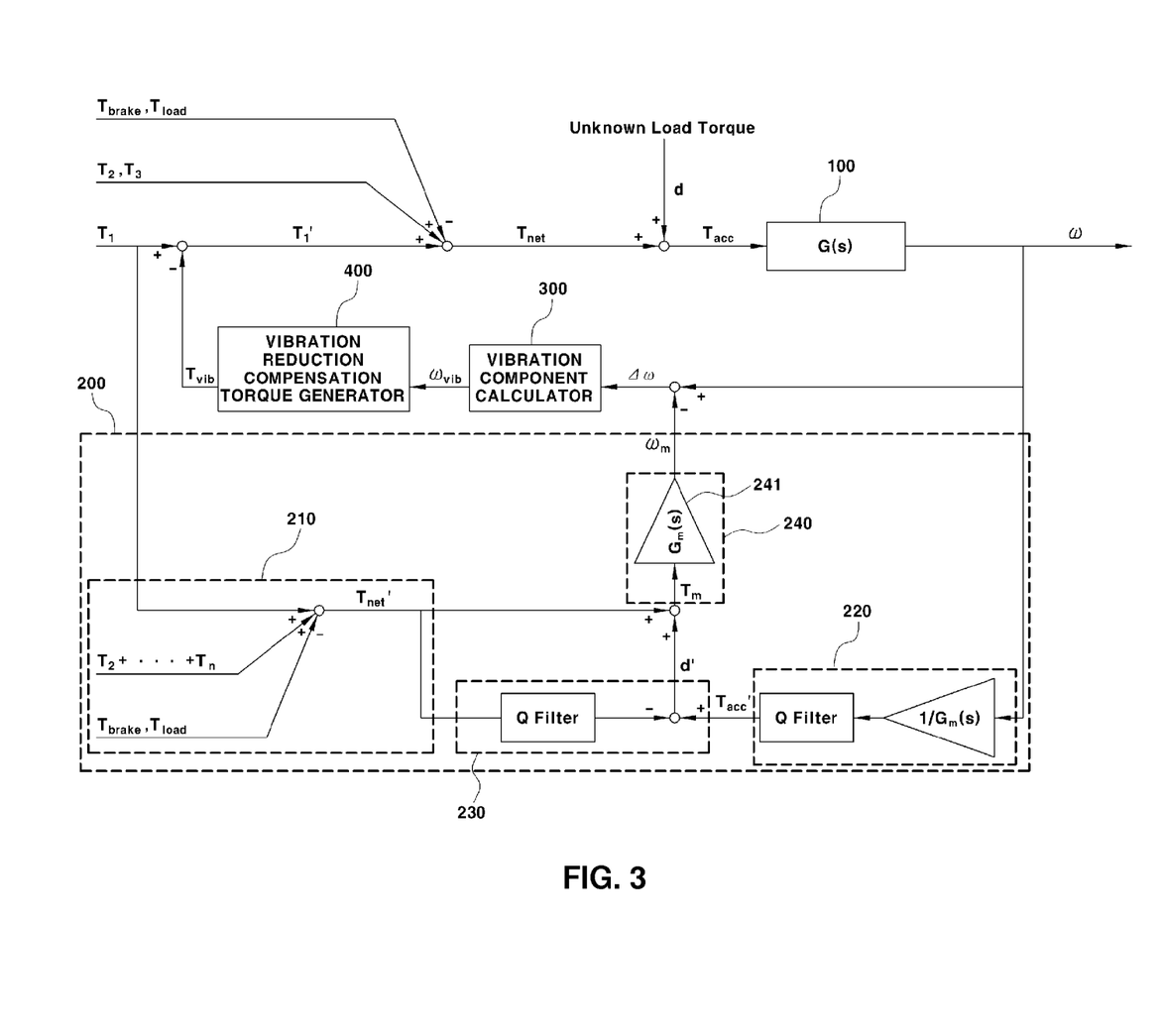
FIG. 3 is a diagram illustrating a control system for reduction in drive shaft vibration of an eco-friendly vehicle according to an embodiment in the present disclosure.
Figure 4:
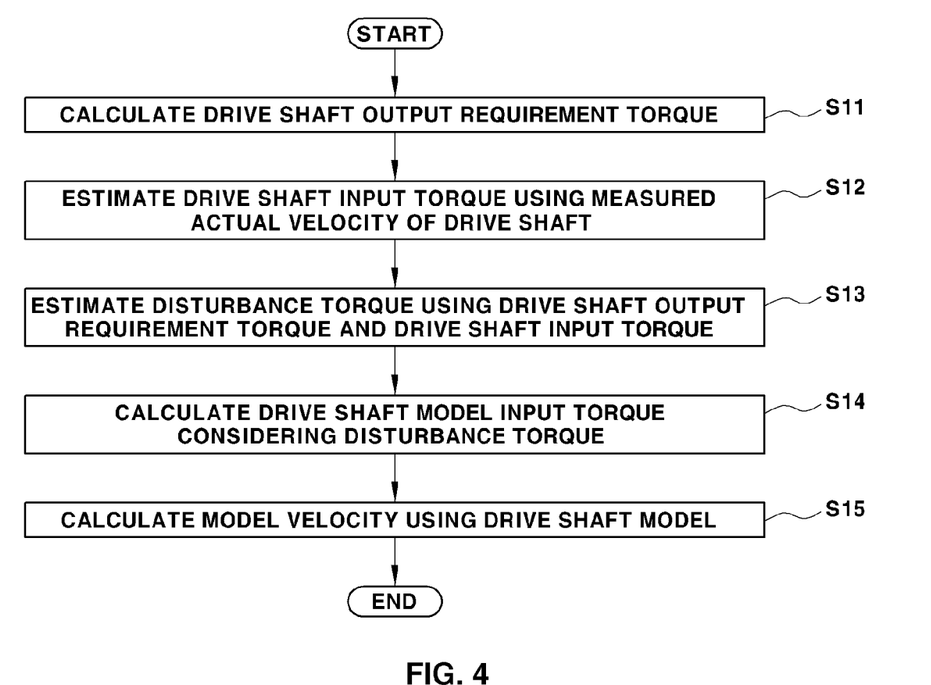
FIG. 4 is a flowchart illustrating a model velocity calculation process in a method for reducing drive shaft vibration of the eco-friendly vehicle according to an embodiment in the present disclosure.

FIG. 3 is a diagram illustrating a control system for reduction in drive shaft vibration of the eco-friendly vehicle according to an embodiment in the present disclosure, and FIG. 4 a flowchart illustrating a model velocity calculation process in a method for reducing drive shaft vibration of the eco-friendly vehicle according to an embodiment in the present disclosure.

The control system for reduction in drive shaft vibration (that is, the anti-jerk control system) illustrated in FIG. 3 may be included in a MCU 17 illustrated in FIGS. 1 and 2.

First, referring to FIG. 3, $T_1$ is a torque required for a driving motor (first motor that drives the vehicle) (MG1) 13, and is a torque value subjected to torque compensation by a vibration reduction compensation torque $T_{vib}$ to reduce drive shaft vibration. The torque value may be a motor torque instruction value for driving the driving motor 13 to output the required torque.

The motor torque instruction value $T_1$ may be an instruction value delivered from a vehicle control unit (VCU) or a hybrid control unit (HCU) (not illustrated) to the MCU 17.

In addition, in the present invention, the MCU 17 controls a torque output of the driving motor 13 using a final torque instruction value $T_1'$ calculated to compensate for the motor torque instruction value $T_1$ by the vibration reduction compensation torque $T_{vib}$ such that vibration generated from the drive shaft can be reduced.

The torque of $T_1'$ is output from the driving motor 13 according to a torque instruction which is compensated by the vibration reduction compensation torque $T_{vib}$, and thus, $T_1'$ may be an actual output torque from the driving motor.

In addition, $T_2$ and $T_3$ are torque values required for the engine 11 and the starter-generator (second motor directly connected to the engine) (MG2) 15, and may be torque output values of the engine 11 and the starter-generator 15 controlled according to instruction values thereof.

However, in the EV, the engine 11 and the starter-generator 15 are not present, and thus, each of $T_2$ and $T_3$ becomes 0.

In addition, $T_{brake}$ is a torque value required for a brake, and $T_{load}$ is a vehicle load torque generated by an angle of inclination of a road on which the vehicle is driven. $T_{load}$ is a torque value that can be calculated from the angle of inclination and a weight of the vehicle.

Referring to FIG. 3, $T_2$, $T_3$, $T_{brake}$, and $T_{load}$ are torques converted into torques of a shaft of the driving motor (MG1).

In addition, referring to FIG. 3, $T_{net}$ is a torque applied to the drive shaft. This torque is a torque considering torques of $T_1'$, $T_2$, $T_3$, $T_{brake}$, and $T_{load}$, that is, output torques and load torques of torque sources (engine, driving motor, starter-generator, and brake) that apply torques to the drive shaft, and may be expressed as below.

$$T_{net} = T_1' + T_2 + T_3 - (T_{brake} + T_{load}) \quad (1)$$

Referring to FIG. 3, $T_{acc}$ is a torque obtained by adding an unknown disturbance torque d applied from the inside or outside of a driven vehicle to $T_{net}$. $T_{acc}$ is an input torque of the drive shaft which actually accelerates/decelerates the drive shaft. $T_{acc}$ is delivered to the drive shaft such that a velocity ω of the drive shaft is output.

Referring to FIG. 3, G(s) represents a transfer function in an actual drive shaft 100.

Here, except the disturbance torque d, all the above-described torques delivered to the drive shaft are known values. Thus, when an estimated value d' of the disturbance torque as close to the actual disturbance torque d as possible can be obtained, a model velocity $\omega_m$ may be accurately calculated.

The actual drive shaft velocity ω is measured and obtained through a sensor, etc., and is used as a variable in a process of calculating the model velocity $\omega_m$ and a process of extracting a vibration component $\omega_{vib}$.

The vibration reduction compensation torque $T_{vib}$ for reduction of vibration generated from the drive shaft may be obtained through a process of calculating the model velocity $\omega_m$, a process of extracting the vibration component $\omega_{vib}$ using an HPF or a band pass filter (BPF) from a difference Δω between the calculated model velocity $\omega_m$ and the measured actual velocity ω, and a process of calculating the vibration reduction compensation torque $T_{vib}$ based on the extracted vibration component $\omega_{vib}$ and driving state information such as a driving mode, a gear stage, etc. of the vehicle.

Here, the model velocity $\omega_m$ is calculated by a drive shaft model velocity calculator 200 based on a torque component input to the drive shaft of the vehicle. As shown in FIG. 4, the model velocity $\omega_m$ is obtained by calculating a drive shaft output requirement torque $T_{net}'$ (S11), estimating a drive shaft input torque $T_{acc}'$ input to the drive shaft using a measured actual velocity ω of the drive shaft (S12), estimating a disturbance torque d' using the calculated drive shaft output requirement torque $T_{net}'$ and the estimated drive shaft input torque $T_{acc}'$ (S13), calculating a drive shaft model input torque $T_m$ considering a disturbance torque using the estimated disturbance torque d' (S14), and calculating the model velocity $\omega_m$ using a drive shaft model 241 which receives the drive shaft model input torque $T_m$ as an input (S15).

The drive shaft output requirement torque $T_{net}'$ may be calculated by a drive shaft output requirement torque calculator 210 which receives torques $T_1$, $T_2$, $T_3$, and $T_{brake}$ required for the driving motor 13, the engine 11, the starter-generator 15, and the brake (not illustrated) and a vehicle load torque $T_{load}$ as inputs (S11), and may be obtained by subtracting the vehicle load torque $T_{load}$ from torques required for torque sources of the vehicle which apply torques to the drive shaft.

The torque sources of the vehicle may correspond to the driving motor 13, the engine 11, the starter-generator 15, and the brake. Here, the torque $T_{brake}$ required for the brake is a negative torque similarly to the load torque $T_{load}$. Thus, the drive shaft output requirement torque $T_{net}'$ may be calculated as in the following Equation.

$$T_{net}' = T_1 + T_2 + T_3 - (T_{brake} + T_{load}) \quad (2)$$

Here, the torque $T_1$ required for the driving motor 13 may correspond to a torque instruction value for the driving motor, and all the torques $T_2$, $T_3$, and $T_{brake}$ required for the engine 11, the starter-generator 15, and the brake correspond to torque values converted into torques of the shaft of the driving motor (MG1).

In this instance, the torques $T_2$ and $T_3$ required for the engine 11 and the starter-generator 15 may correspond to values obtained by converting values of an engine torque instruction and a starter-generator torque instruction into torques of the shaft of the driving motor (MG1), respectively, and the torque $T_{brake}$ required for the brake may correspond to a converted value of a brake torque which needs to be generated by a brake of a driving wheel.

Next, the drive shaft input torque $T_{acc}'$ using the measured actual velocity ω of the drive shaft (S12) is estimated by a drive shaft input torque estimator 220 of FIG. 3 which receives the actual velocity ω of the drive shaft as an input.

As described in the foregoing, when the actual drive shaft input torque $T_{acc}$ is applied to the drive shaft, the drive shaft is rotated at a velocity of ω. When a transfer function in the drive shaft 100 is referred to as G(s), the actual velocity of the drive shaft ω and the drive shaft input torque $T_{acc}$ may be expressed by the following Equations.

$$\omega = G(s) \times T_{acc} \quad (3)$$

$$T_{acc} = \omega / G(s) \quad (4)$$

In the above Equation (4), G(s) is the transfer function in the actual drive shaft 100. Thus, when a transfer function of an ideal drive shaft model which models the actual drive shaft 100, that is, the drive shaft model 241 designed to calculate the ideal model velocity $\omega_m$ ignoring vibration is referred to as $G_m(s)$, the drive shaft input torque $T_{acc}'$ may be estimated using $G_m(s)$ instead of G(s) in Equation 4.

When the drive shaft is presumed to be a rigid body, and an estimated value of the drive shaft input torque is referred to as $T_{acc}'$, the estimated value of the drive shaft input torque may be expressed by the following Equation.

$$T_{acc}' \delta / G_m(s) = \Omega \times J_m s, \text{ wherein } G_m(s) = 1/J_m s \quad (5)$$

In Equation (5), $J_m$ denotes a moment of inertia of the drive shaft which is a rigid body.

Referring to Equation (5), the transfer function $G_m(s)$ for calculating the estimated value of the drive shaft input torque $T_{acc}'$ applied to the drive shaft from the actual velocity of the drive shaft ω is a system in which an order of the numerator is greater than an order of the denominator. Thus, from a mathematical point of view, the transfer function $G_m(s)$ is calculated by differentiating the actual drive shaft velocity and multiplying by the moment of inertia, and thus is vulnerable to a noise component of the actual velocity of the drive shaft.

In this regard, the denominator and the numerator may have the same order by using a filter Q. When a primary low pass filter LPF is used in the present embodiment, the drive shaft input torque $T_{acc}'$ may be estimated as in the following Equation.

$$\begin{aligned} T'_{acc} &= Q(s) \times \omega / G_m(s) \\ &= \omega \times J_m s / (\tau s + 1), \end{aligned} \quad (6)$$

$$\text{wherein } Q(s) = 1/(\tau s + 1)$$

Q(s) is a transfer function of the LPF, and a time constant τ of the LPF Q is greater than a frequency of a vibration component such that a torque estimated by the vibration component can be excluded.

The transfer function Q(s) of the filter is set such that an order of the numerator is less than or equal to an order of the denominator in $Q(s)/G_m(s)$ at all times, and the filter is additionally applied such that an order of the numerator is constantly less than or equal to an order of the denominator in the transfer function $Q(s)/G_m(s)$ for calculating the estimated value of the drive shaft input torque $T_{acc}'$ from the actual velocity of the drive shaft ω, thereby ensuring robustness against the noise component.

Next, the estimated value d' of the disturbance torque is calculated by a disturbance torque estimator 230 which receives the drive shaft output requirement torque $T_{net}'$ and the drive shaft input torque $T_{acc}'$ as inputs, and may be calculated to be a difference between the drive shaft output requirement torque $T_{net}'$ calculated by the drive shaft output requirement torque calculator 210 and the drive shaft input torque $T_{acc}'$ calculated by the drive shaft input torque estimator 220.

In this instance, the same filter Q as the filter used when the drive shaft input torque is estimated is applied to the drive shaft output requirement torque $T_{net}'$ output from the drive shaft output requirement torque calculator 210 such that phase lag and magnitude change, which occur from the filter, similarly occur from the drive shaft output requirement torque, and the estimated value d' of the disturbance torque is calculated using the drive shaft output requirement torque which is subjected to low-pass filtering through the filter Q.

When the primary LPF is used, the disturbance torque d' may be estimated as in the following Equation.

$$d' = Q(s) \times T_{net}' - T_{acc}' = T_{net}'/(\tau s+1) - \omega \times J_m s/(\tau s+1) \quad (7)$$

When the disturbance torque d' is estimated as described above, the drive shaft model input torque $T_m$ for calculation of the model velocity is calculated using the estimated disturbance torque d' and the drive shaft output requirement torque $T_{net}'$ calculated from the drive shaft output requirement torque calculator 210. In this instance, an equation for calculation of the drive shaft model input torque $T_m$ for calculation of the model velocity may be expressed by the following Equation.

$$T_m = T_m' + d' \quad (8)$$

As described above, when the drive shaft model input torque $T_m$ is calculated, the model velocity $\omega_m$ is calculated by a velocity calculator 240 which receives the drive shaft model input torque $T_m$ as an input. In this instance, the model velocity $\omega_m$ may be calculated by an equation below from the drive shaft model input torque $T_m$ using the transfer function $G_m(s)$ of the drive shaft model 241.

$$\omega_m = G_m(s) \times T = T_m / J_m s \quad (9)$$

When the model velocity $\omega_m$ is calculated as described above, a vibration component calculator 300 obtains a vibration component based on a deviation Δω between the model velocity $\omega_m$ and the actual velocity ω. In this instance, the vibration component $\omega_{vib}$ can be calculated by applying an error elimination controller such as the HPF, etc. to the difference Δω between the model velocity $\omega_m$ and the actual velocity ω.

Subsequently, after the vibration component $\omega_{vib}$ is obtained, a vibration reduction compensation torque generator 400 calculates the vibration reduction compensation torque $T_{vib}$ based on the extracted vibration component $\omega_{vib}$ and driving state information such as a driving mode, a gear stage, etc. of the vehicle.

The vibration component $\omega_{vib}$ using the model velocity $\omega_m$ and the actual velocity ω and the vibration reduction compensation torque $T_{vib}$ based on the calculated vibration component $\omega_{vib}$ and the driving state information of the vehicle may be calculated using the conventional method.

When the vibration reduction compensation torque $T_{vib}$ is obtained as described above, the MCU 17 compensates for the torque instruction value $T_1$ for the driving motor 13 by the vibration reduction compensation torque $T_{vib}$, and controls a torque output of the driving motor 13 according to the compensated final torque instruction value $T_1'$.

According to another embodiment, a plurality of model velocity calculation schemes may be applied, and one of the plurality of model velocity calculation schemes may be selected based on vehicle state information.

Figure 5:
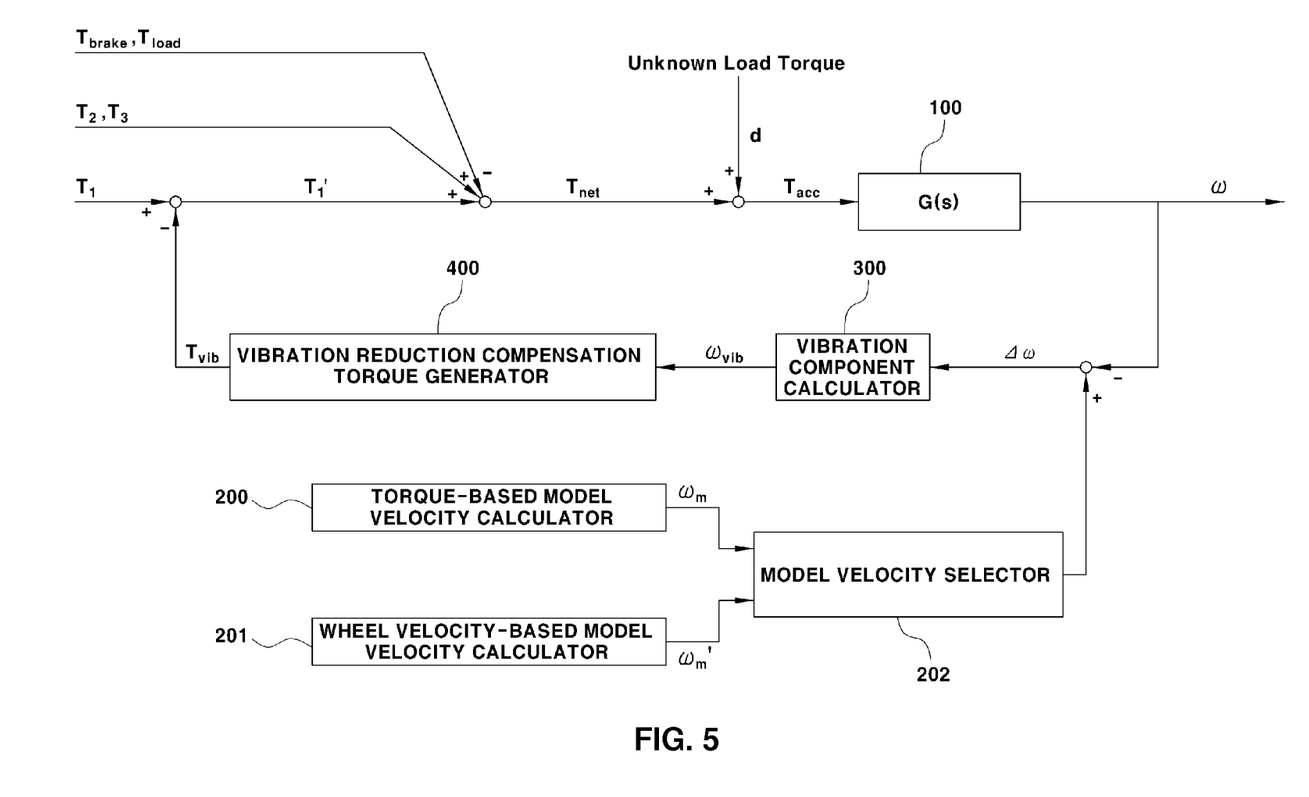
FIG. 5 is a diagram illustrating a configuration of a control system for reduction in drive shaft vibration of the eco-friendly vehicle capable of selecting a model velocity calculation scheme according to another embodiment in the present disclosure.

A process of selecting a model velocity calculation scheme is additionally provided such that an advantage of each model velocity calculation scheme can be used according to a vehicle state. FIG. 5 illustrates a configuration of a control system for reduction in drive shaft vibration of the eco-friendly vehicle capable of selecting a model velocity calculation scheme as another embodiment.

The embodiment of FIG. 5 is an embodiment allowing selection of a model velocity calculation scheme suitable for a current vehicle state from two model velocity calculation schemes, and one of the two model velocity calculation schemes is a model velocity calculation scheme described with reference to FIGS. 3 and 4, that is, a scheme in which a model velocity is calculated by the drive shaft model velocity calculator 200 of FIG. 3.

In addition, the other of the two model velocity calculation schemes is a conventional model velocity calculation scheme.

The model velocity calculation scheme according to the embodiment of FIGS. 3 and 4 is a scheme of calculating a model velocity $\omega_m$ using a torque component, in which velocity delay does not occur when compared to an actual velocity of the drive shaft.

In addition, the conventional model velocity calculation scheme is a scheme of calculating a model velocity $\omega_m'$ using a wheel velocity. The wheel velocity is a component generated when vibration of the drive shaft is attenuated. Thus, when the wheel velocity is used, an accurate model velocity can be calculated. In addition, the model velocity is calculated using only signal processing for the wheel velocity, and thus, a load factor is low.

Therefore, the embodiment of FIG. 5 allows selection of a model velocity calculation scheme according to a vehicle state such that the above-described advantages of the respective model velocity calculation schemes can be used. In description below, the model velocity calculation scheme according to the embodiment of FIGS. 3 and 4 will be referred to as a torque-based model velocity calculation scheme, and the conventional model velocity calculation scheme will be referred to as a wheel velocity-based model velocity calculation scheme.

In addition, a model velocity $\omega_m$ obtained by the torque-based model velocity calculation scheme will be referred to as a torque-based model velocity, and a model velocity $\omega_m'$ obtained by the wheel velocity-based model velocity calculation scheme will be referred to as a wheel velocity-based model velocity.

Referring to FIG. 5, reference numeral 200 denotes a torque-based model velocity calculator that calculates a model velocity according to the torque-based model velocity calculation scheme, and reference numeral 201 denotes a wheel velocity-based model velocity calculator that calculates a model velocity according to the wheel velocity-based model velocity calculation scheme.

Reference numeral 202 denotes a model velocity selector that selects and changes a model velocity calculation scheme and outputs a model velocity calculated according to the selected model velocity calculation scheme in description below.

First, vehicle state information may correspond to a gear stage of a transmission in a vehicle including the transmission, and a model velocity calculation scheme is selected according to the gear stage.

In a low stage less than or equal to a set stage, a gear ratio of a drive shaft to a wheel is great, and thus a delay component of a wheel velocity may be great from a view point of the drive shaft. Therefore, the torque-based model velocity $\omega_m$ is advantageously used. Conversely, in a high stage greater than the set stage, the wheel velocity-based model velocity $\omega_m'$ is advantageously used.

Figure 6:
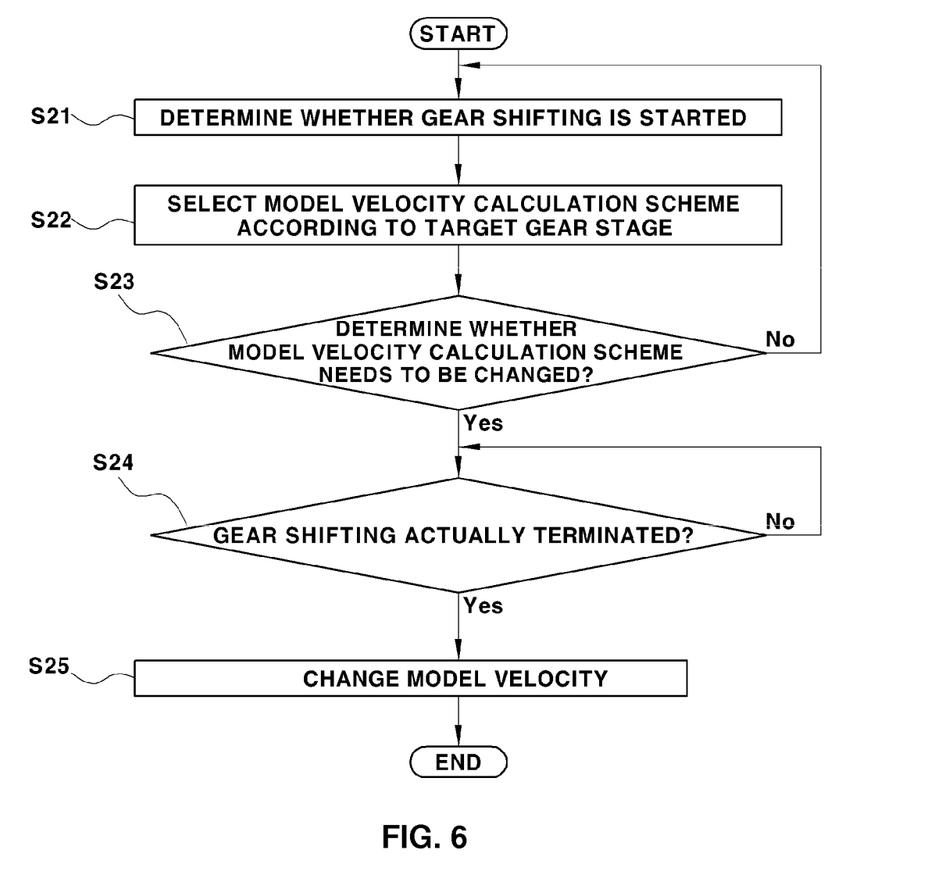
FIG. 6 is a flowchart illustrating a process of selecting a model velocity calculation scheme and a model velocity according to a gear stage according to another embodiment in the present disclosure.

FIG. 6 illustrates a process of selecting a model velocity calculation scheme and a model velocity according to a gear stage, and illustrates a process of changing a model velocity when a gear is shifted. First, in S21, the MCU 17 determines whether the gear is shifted based on a signal delivered from a transmission control unit (TCU) (not illustrated).

When the gear is shifted, that is, when gear shifting is determined to be started, a model velocity calculation scheme to be used after gear shifting is determined based on a target gear stage of gear shifting in S22.

When the model velocity calculation scheme according to the target gear stage is determined, whether a currently used model velocity calculation scheme needs to be changed is determined by comparing the determined model velocity calculation scheme after gear shifting with the currently used model velocity calculation scheme in S23.

When the model velocity calculation scheme after gear shifting is different from the current model velocity calculation scheme, whether gear shifting is actually terminated is determined in S24. When actual termination of gear shifting is verified from a signal of a transmission controller, the current model velocity calculation scheme is changed to the new model velocity calculation scheme determined according to the target gear stage in S25.

Here, when a model velocity calculation scheme is changed from the wheel velocity-based model velocity calculation scheme to the torque-based model velocity calculation scheme, an actual velocity of the drive shaft co at the time of change is used as a model velocity calculation initial value (initial model velocity $\omega_m$).

When a model velocity calculation scheme is changed from the torque-based model velocity calculation scheme to the wheel velocity-based model velocity calculation scheme, the calculation scheme may be directly changed using a wheel velocity at the time of change.

In other words, a model velocity $\omega_m'$ calculated by the changed wheel velocity-based model velocity calculation scheme is directly used as a model velocity initial value at the time of termination of gear shifting. Since a vibration reduction torque compensation function is deactivated at the time of gear shifting, the function is initialized at the time of termination of gear shifting, and then the function is activated again, an initial value of a model velocity at the time of changing the calculation scheme is not problematic.

Next, at least one of a vehicle speed, a value of an accelerator pedal position sensor (APS), and a value of a brake pedal sensor (BPS) may correspond to vehicle state information that determines a model velocity calculation scheme as an example applicable to a vehicle which does not include a transmission.

Figure 7:
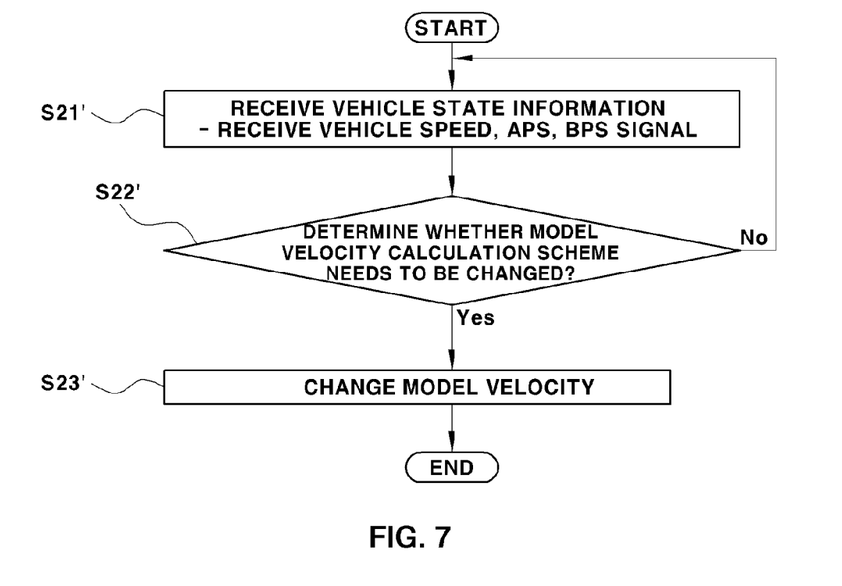
FIG. 7 is a flowchart illustrating a process of selecting a model velocity calculation scheme and a model velocity according to a vehicle speed, a value of an accelerator pedal position sensor (APS), and a value of a brake pedal sensor (BPS) according to another embodiment in the present disclosure.

FIG. 7 illustrates a process of selecting a model velocity calculation scheme and a model velocity according to a vehicle speed, a value of the APS, and a value of the BPS. The MCU 17 receives vehicle state information such as a vehicle speed, a value of the APS, and a value of the BPS in S21', and determines whether a model velocity calculation scheme needs to be changed based on the received vehicle state information in S22'.

When vehicle speed information is used, the torque-based model velocity calculation scheme is used (torque-based model velocity is selected) under the condition of a low speed less than or equal to a predetermined reference vehicle speed, and the wheel velocity-based model velocity calculation scheme is used (wheel velocity-based model velocity is selected) under the condition of a high speed exceeding the reference vehicle speed.

In addition, the APS is a sensor for detecting an operation state of an accelerator pedal, and the BPS is a sensor for detecting an operation state of a brake pedal. The vehicle is determined to be in a rapidly accelerated state when a rate of change (or the amount of change) of a value of the APS is greater than or equal to a first reference value, and is determined to be in a rapidly decelerated state when a rate of change (or the amount of change) of a value of the BPS is greater than or equal to a second reference value.

When the vehicle is determined to be in the rapidly accelerated/decelerated state based on the value of the APS and the value of the BPS, the torque-based model velocity calculation scheme is used (torque-based model velocity is selected). Otherwise, the wheel velocity-based model velocity calculation scheme is used (wheel velocity-based model velocity is selected).

When a model velocity calculation scheme is determined based on current vehicle state information such as a vehicle speed, a value of the APS, or a value of the BPS as described above, the determined model velocity calculation scheme is compared with a currently used model velocity calculation scheme to determine whether the model velocity calculation scheme needs to be changed.

When the model velocity calculation scheme needs to be changed, the model velocity calculation scheme is changed to a new model velocity calculation scheme determined based on the current vehicle state information in S23'.

When the model velocity calculation scheme is changed from the wheel velocity-based model velocity calculation scheme to the torque-based model velocity calculation scheme in a process of changing a model velocity calculation scheme (changing a model velocity) as described above, a wheel velocity-based model velocity value at the time of change is used as an initial value of a torque-based model velocity.

When the model velocity calculation scheme is changed from the torque-based model velocity calculation scheme to the wheel velocity-based model velocity calculation scheme, a value is determined according to a wheel velocity, and thus, an initial point cannot be set. Therefore, a discontinuous point of a model velocity may be generated at the time of change.

A discontinuous point of a model velocity which is generated when the vibration reduction torque compensation function is continuously activated is a factor that degrades vibration component extraction performance, and thus, an initial point of a wheel velocity-based model velocity needs to be virtually set when a calculation scheme is changed. An equation for calculating a model velocity by setting a virtual initial point is given below.

$$\omega_m{''}=\omega_m{'}-\omega_{m\_init}+\omega_{m\_offset} \quad (10)$$

$\omega_m{''}$ is a model velocity to which a virtual initial point is applied when a calculation scheme is changed, and the model velocity $\omega_m{''}$ of the virtual initial point is a model velocity at the time of change to the wheel velocity-based model velocity calculation scheme.

$\Omega_{m\_init}$ is a difference value between the torque-based model velocity $\omega_m$ and the wheel velocity-based model velocity $\omega_m{'}$ at the time of using an initial value (at the time of changing a calculation scheme), and $\omega_{m\_offset}$ is a value which is set to vary from 0 to $\omega_{m\_init}$ with a constant slope or pattern. For example, $\omega_{m\_offset}$ may be calculated using a scheme illustrated in FIG. 8.

Figure 8:
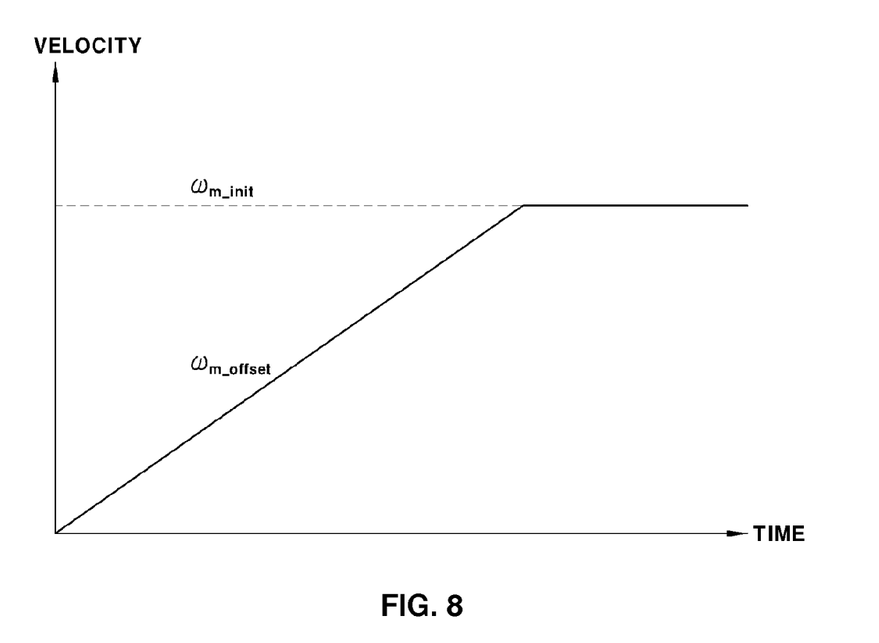
FIGS. 8 and 9 are diagrams illustrating a method of calculating a model velocity initial value at the time of change to a wheel velocity-based model velocity calculation scheme according to vehicle state information such as a vehicle speed, a value of an APS, and a value of a BPS according to another embodiment in the present disclosure.

Referring to FIG. 8, $\omega_{m\_offset}$ is set to a determined velocity value for $\omega_{m\_init}$ with respect to time.

Figure 9:
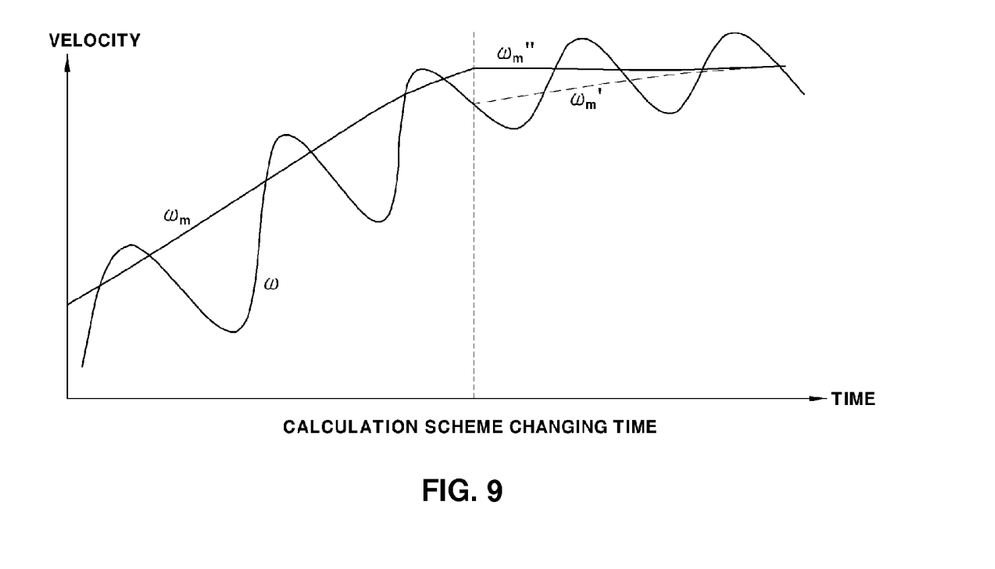

When an initial value $\omega_m{''}$ to be set is designated as a model velocity value of the wheel velocity-based calculation scheme at the time of changing a calculation scheme, it is possible to calculate a model velocity excluding a discontinuous point as in FIG. 9.

As described in the foregoing, the present disclosure proposes an improved model velocity calculation scheme capable of extracting an accurate vibration component in a process of reducing vibration generated from a drive shaft of an eco-friendly vehicle.

In the related art, a model velocity has been calculated using a wheel velocity or calculated based on a drive shaft input torque using a drive shaft model. When the model velocity is calculated using the wheel velocity, accuracy of the model velocity is high. However, an erroneous vibration component may be extracted since a model velocity is delayed when compared to an actual velocity at the time of acceleration/deceleration of a vehicle. When the model velocity is calculated based on the drive shaft input torque by designing the drive shaft model, the model velocity is not delayed at the time of acceleration/deceleration of the vehicle. However, accuracy of the model velocity is degraded due to inaccuracy of the model and a load torque, etc.

On the other hand, according to the present disclosure, a drive shaft model is designed and a model velocity is calculated based on a drive shaft input torque, and thus the model velocity is not delayed at the time of acceleration/deceleration of a vehicle. At the same time, a disturbance torque delivered to the vehicle is observed through a disturbance observer and the model velocity is calculated based on the disturbance torque, and thus accuracy of the model velocity may be enhanced. Therefore, it is possible to more accurately extract a vibration component.

According to a control method for reduction in drive shaft vibration of an eco-friendly vehicle of the present disclosure, a model velocity calculation scheme is improved such that an accurate vibration component can be extracted, thereby effectively reducing vibration generated from a drive shaft.

In addition, one of a torque-based model velocity calculation scheme and a wheel velocity-based model velocity calculation scheme is selected and used when a model velocity is calculated, thereby having an effect of using advantages of both calculation schemes according to vehicle state.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for reducing vibration of a drive shaft of an eco-friendly vehicle, the method comprising:
   acquiring an actual velocity of the drive shaft from which a torque of a driving motor driving the vehicle is output;
   calculating a model velocity of the drive shaft;
   obtaining a vibration component based on a deviation between the acquired actual velocity of the drive shaft and the calculated model velocity; and
   generating a vibration reduction compensation torque for reducing vibration of the drive shaft from the vibration component,
   wherein the step of calculating includes:
   calculating a drive shaft output requirement torque based on a torque delivered to the drive shaft;

estimating a drive shaft input torque, which is inputted to the drive shaft, using the actual velocity of the drive shaft;

estimating a disturbance torque using the drive shaft output requirement torque and the drive shaft input torque;

calculating a drive shaft model input torque, which is obtained by adding the disturbance torque to the drive shaft output requirement torque, using the estimated disturbance torque; and calculating the model velocity using a drive shaft model which receives the drive shaft model input torque as an input.

2. The method according to claim 1, wherein the drive shaft output requirement torque is calculated by subtracting a sum of a vehicle load torque and a brake torque required for a brake of a driving wheel from a sum of torques required for the driving motor, an engine, and a starter-generator directly connected to the engine, respectively, in a hybrid electric vehicle (HEV) of the eco-friendly vehicle using the driving motor and the engine as driving sources of the vehicle.

3. The method according to claim 1, wherein the drive shaft output requirement torque is calculated by subtracting a sum of a vehicle load torque and a brake torque required for a brake of a driving wheel from a torque required for the driving motor in an electric (EV) of the eco-friendly vehicle vehicle using the driving motor as a driving source of the vehicle.

4. The method according to claim 1, wherein the step of estimating the drive shaft input torque comprises estimating the drive shaft input torque using a transfer function of the drive shaft model and the actual velocity (co) of the drive shaft, wherein the drive shaft input torque ($T_{acc}'$) is estimated using the following Equation:

$$T_{acc}'=Q(s)\times\omega/G_m(s),$$

in which $Q(s)$ is a transfer function of a filter, and $G_m(s)$ is the transfer function of the drive shaft model.

5. The method according to claim 4, wherein the transfer function $Q(s)$ of the filter is set such that an order of a numerator is less than or equal to an order of a denominator in $Q(s)/G_m(s)$.

6. The method according to claim 4,
wherein a primary low pass filter (LPF) is used as the filter, and
the transfer function of the filter is $Q(s)=1/(\tau s+1)$, in which T denotes a time constant of the filter.

7. The method according to claim 4, wherein the transfer function of the drive shaft model is $G_m(s)=1/J_m s$, in which $J_m$ denotes a moment of inertia of the drive shaft.

8. The method according to claim 4,
wherein the disturbance torque (d') is estimated by using the filter (Q) and using the following Equation:

$$d'=Q(s)\times T_{net}'-T_{acc}',$$

in which $Q(s)$ denotes the transfer function of the filter, $T_{net}'$ denotes the drive shaft output requirement torque, and $T_{acc}'$ denotes the drive shaft input torque, and a filter having the same transfer function as a transfer function of a filter used to estimate the drive shaft input torque is applied to the filter (Q) for estimating the disturbance torque (d').

9. The method according to claim 1, wherein the step of estimating the disturbance torque comprises calculating the disturbance torque to be a difference value between the drive shaft output requirement torque and the drive shaft input torque.

10. The method according to claim 9, wherein a filter for eliminating a noise component is applied to the drive shaft output requirement torque to estimate the disturbance torque (d') using the following Equation:

$$d'=Q(s)\times T_{net}'-T_{acc}',$$

in which $Q(s)$ denotes a transfer function of the filter, $T_{net}'$ denotes the drive shaft output requirement torque, and $T_{acc}'$ denotes the drive shaft input torque.

11. The method according to claim 10,
wherein a primary low pass filter (LPF) is used as the filter, and
the transfer function of the filter is $Q(s)=1/(\tau s+1)$, in which $\tau$ denotes a time constant of the filter.

12. The method according to claim 1, wherein the calculating of the model velocity comprises calculating the model velocity ($\omega_m$) using the following Equation:

$$\omega_m=G_m(s)\times T_m,$$

in which $G_m(s)$ denotes a transfer function of the drive shaft model, and $T_m$ denotes the drive shaft model input torque.

13. The method according to claim 12, wherein the transfer function of the drive shaft model is $G_m(s)=1/J_m s$, in which $J_r$, denotes a moment of inertia of the drive shaft.

14. A method for reducing vibration of a drive shaft of an eco-friendly vehicle comprising:

acquiring current vehicle state information;

acquiring an actual velocity of the drive shaft from which a torque of a driving motor driving the vehicle is output;

determining a model velocity calculation scheme corresponding to one of a torque-based model velocity calculation scheme and a wheel velocity-based model velocity calculation scheme of calculating a model velocity based on wheel velocity information of the vehicle according to the acquired vehicle state information;

calculating a model velocity of the drive shaft by changing a current model velocity calculation scheme to the determined model velocity calculation scheme when the determined model velocity calculation scheme is different from the current model velocity calculation scheme;

obtaining a vibration component based on a deviation between the acquired actual velocity of the drive shaft and the calculated model velocity; and generating a vibration reduction compensation torque for reduction in vibration of the drive shaft from the vibration component.

15. The method according to claim 14, wherein the vehicle state information is a gear stage of a transmission,
wherein the torque-based model velocity calculation scheme is determined when a target gear stage is lower than or equal to a set stage when the gear stage shifts, and the wheel velocity-based model velocity calculation scheme is determined when a current gear stage is higher than the set stage.

16. The method according to claim 15, wherein the model velocity calculation scheme is determined according to the target gear stage in response to gear shifting, and then the current model velocity calculation scheme is changed to the determined model velocity calculation scheme after the termination of gear shifting.

17. The method according to claim 16, wherein, when the model velocity calculation scheme is changed from the wheel velocity-based model velocity calculation scheme to the torque-based model velocity calculation scheme, an actual velocity of the drive shaft corresponding to a point in time at which the model velocity calculation scheme is changed is used as an initial model velocity in the changed torque-based model velocity calculation scheme.

18. The method according to claim 14, wherein the vehicle state information is a vehicle speed, a value of an accelerator pedal position sensor (APS), or a value of a brake pedal sensor (BPS).

19. The method according to claim 18, wherein the torque-based model velocity calculation scheme is determined when the vehicle speed is less than or equal to a reference vehicle speed, and the wheel velocity-based model velocity calculation scheme is determined when the vehicle speed exceeds the reference vehicle speed.

20. The method according to claim 18, wherein the torque-based model velocity calculation scheme is determined when a rate of change or the amount of change of the value of the APS is greater than or equal to a reference value, and the wheel velocity-based model velocity calculation scheme is determined when the rate of change or the amount of change of the value of the APS is less than the reference value.

21. The method according to claim 18, wherein the torque-based model velocity calculation scheme is determined when a rate of change or the amount of change of the value of the BPS is greater than or equal to a reference value, and the wheel velocity-based model velocity calculation scheme is determined when the rate of change or the amount of change of the value of the BPS is less than the reference value.

22. The method according to claim 18, wherein, when the model velocity calculation scheme is changed from the wheel velocity-based model velocity calculation scheme to the torque-based model velocity calculation scheme, the model velocity calculated using the wheel velocity-based model velocity calculation scheme corresponding to a point in time at which the model velocity calculation scheme is changed is used as an initial model velocity in the changed torque-based model velocity calculation scheme.

23. The method according to claim 18, wherein, when the model velocity calculation scheme is changed from the torque-based model velocity calculation scheme to the wheel velocity-based model velocity calculation scheme, an initial model velocity ($\omega_m''$) in the changed wheel velocity-based model velocity calculation scheme is obtained using the following Equation:

$$\omega_m''=\omega_m'-\omega_{m\_init}+\omega_{m\_offset},$$

in which $\omega_m'$ denotes a model velocity calculated using the wheel velocity-based model velocity calculation scheme corresponding to a point in time at which the model velocity calculation scheme is changed, $\omega_{m\_init}$ denotes a difference value between model velocities calculated using the torque-based model velocity calculation scheme and the wheel velocity-based model velocity calculation scheme, respectively, at a point in time at which the model velocity calculation scheme is changed, and $\omega_{m\_offset}$ denotes a value set to vary from 0 to $\omega_{m\_init}$ with a constant slope or pattern and is a velocity determined to be a value according to $\omega_{m\_init}$.

* * * * *